United States Patent
Dai et al.

(10) Patent No.: US 11,159,267 B2
(45) Date of Patent: Oct. 26, 2021

(54) METHOD AND DEVICE FOR TRANSMITTING AND PROCESSING DATA PACKET, AND COMMUNICATION DEVICE

(71) Applicant: SZ DJI TECHNOLOGY CO., LTD., Shenzhen (CN)

(72) Inventors: Jin Dai, Shenzhen (CN); Wei Fan, Shenzhen (CN); Ying Chen, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 114 days.

(21) Appl. No.: 16/733,576

(22) Filed: Jan. 3, 2020

(65) Prior Publication Data

US 2020/0145124 A1 May 7, 2020

Related U.S. Application Data (63) Continuation of application No. PCT/CN2017/095325, filed on Jul. 31, 2017.

(51) Int. Cl.
*H04L 1/00* (2006.01)
*H04L 12/26* (2006.01)

(52) U.S. Cl.
CPC .......... *H04L 1/0003* (2013.01); *H04L 1/0009* (2013.01); *H04L 43/0823* (2013.01)

(58) Field of Classification Search
CPC . H04L 1/0003; H04L 1/0009; H04L 43/0823; H04L 43/0847; H04L 1/203; H04L 1/0015; H04L 1/1607; H04L 1/0033
See application file for complete search history.

(56) References Cited

U.S. PATENT DOCUMENTS

2010/0120464 A1* 5/2010 Bjorken ............... H04L 1/0009
455/522
2012/0076023 A1* 3/2012 Ko ...................... H04B 7/0478
370/252

(Continued)

FOREIGN PATENT DOCUMENTS

CN 100505606 C 6/2009
CN 101478366 A 7/2009

(Continued)

OTHER PUBLICATIONS

The World Intellectual Property Organization (WIPO) International Search Report for PCT/CN2017/095325 dated Apr. 26, 2018 5 pages.

*Primary Examiner* — Tejis Daya
(74) *Attorney, Agent, or Firm* — Anova Law Group, PLLC (57) ABSTRACT

A data transmission processing method is provided for a communication device. The method includes calculating a packet-error-rate level parameter after a basic adjustment process, if it is detected that the basic adjustment process is performed on a modulation and encoding policy of a sending end during a data packet transmission process; obtaining the packet-error-rate change information by comparing a packet-error-rate level parameter before the basic adjustment process with a packet-error-rate level parameter after the basic adjustment process; and performing an upgrade adjustment process on the modulation and encoding policy that is adjusted by the basic adjustment process, if the packet-error-rate change information satisfies a preset adjustment processing condition.

22 Claims, 5 Drawing Sheets

(56) References Cited

U.S. PATENT DOCUMENTS

| | | | |
|---|---|---|---|
| 2013/0051270 A1 | 2/2013 | Ren et al. | |
| 2013/0301542 A1* | 11/2013 | Krishnamurthy | H04W 72/042 |
| | | | 370/329 |
| 2015/0264598 A1 | 9/2015 | Park et al. | |
| 2017/0332268 A1* | 11/2017 | Yang | H04W 72/042 |

FOREIGN PATENT DOCUMENTS

| | | |
|---|---|---|
| CN | 101547076 A | 9/2009 |
| CN | 104348574 A | 2/2015 |
| CN | 104426628 A | 3/2015 |
| CN | 105634655 A | 6/2016 |
| WO | 2015165166 A1 | 11/2015 |

\* cited by examiner

METHOD AND DEVICE FOR TRANSMITTING AND PROCESSING DATA PACKET, AND COMMUNICATION DEVICE

CROSS-REFERENCE TO RELATED APPLICATION

This application is a continuation of International Application No. PCT/CN2017/095325, filed Jul. 31, 2017, the entire content of which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to the field of communication technology and, more particularly, to a method and device for transmitting and processing data packet, and a communication device.

BACKGROUND

In recent years, mobile communication technology has made rapid progresses. People enjoy the convenience brought by mobile communication technology in their daily work and living at all the time, such as transmitting, receiving, and sharing information wirelessly. Civil aircraft industry and other industries benefit from the advance of mobile communication technology as well. For example, it is often needed to transmit wirelessly control commands or images taken by a photographing device mounted on an aircraft or an unmanned aerial vehicle (UAV).

When data is transmitted via mobile communication technologies, the data to be sent is firstly modulated and encoded to form a data packet. Then the data packet is sent to a receiving end. The receiving end demodulates and decodes the data packet to obtain the original data. During the process, how to better ensure the quality and speed of the data packet transmission has become a hot issue for research.

SUMMARY

In accordance with the disclosure, a data transmission and processing method for a communication device includes calculating a packet-error-rate level parameter after a basic adjustment process, if it is detected that the basic adjustment process is performed on a modulation and encoding policy of a sending end during a data packet transmission process; obtaining the packet-error-rate change information by comparing a packet-error-rate level parameter before the basic adjustment process with a packet-error-rate level parameter after the basic adjustment process; and performing an upgrade adjustment process on the modulation and encoding policy that is adjusted by the basic adjustment process, if the packet-error-rate change information satisfies a preset adjustment processing condition.

Also in accordance with the disclosure, a data transmission processing device includes an acquisition module, a comparison module, and a processing module. The acquisition module is configured to calculate a packet-error-rate level parameter after a basic adjustment process if it is detected that the basic adjustment process is performed on a modulation and encoding policy of a sending end during a data packet transmission process. The comparison module is configured to compare a packet-error-rate level parameter before the basic adjustment process and a packet-error-rate level parameter after the basic adjustment process to obtain the packet-error-rate change information. The processing module is configured to perform an upgrade adjustment process on the modulation and encoding policy that is processed by the basic adjustment process, when the packet-error-rate change information meets a preset adjustment processing condition.

Also in accordance with the disclosure, a communication device includes a processor and a storage device. The processor is configured to execute program instructions stored at the storage device; calculate a packet-error-rate level parameter after a basic adjustment process, if it is detected that the basic adjustment process is performed on a modulation and encoding policy of a sending end during a data packet transmission process; obtain packet-error-rate change information by comparing a packet-error-rate level parameter before the basic adjustment process and a packet-error-rate level parameter after the basic adjustment process; and perform an upgrade adjustment process on the modulation and encoding policy that is adjusted by the basic adjustment process, if the packet-error-rate change information meets a preset adjustment processing condition.

DETAILED DESCRIPTION OF THE EMBODIMENTS

Technical solutions of the present disclosure will be described with reference to the drawings. It will be appreciated that the described embodiments are part rather than all of the embodiments of the present disclosure. Other embodiments conceived by those having ordinary skills in the art on the basis of the described embodiments without inventive efforts should fall within the scope of the present disclosure.

Exemplary embodiments will be described with reference to the accompanying drawings, in which the same numbers refer to the same or similar elements unless otherwise specified. Features in various embodiments may be combined, when there is no conflict.

Before an unmanned aerial vehicle (UAV) transmits certain data (such as images collected) through a wireless communication channel, the UAV needs to modulate and encode the data that needs to be sent, and then transmit it on the wireless channel. The modulation and encoding policy used determines the quality and speed of data transmission. In one embodiment of the present disclosure, data packets may be modulated and encoded using an adaptive modulation and encoding technology. In a modulation and encoding processing process, the modulation of a data packet and the mode of bit rate are changed in real time according to the change of the communication channel condition. In scenarios with better wireless channel quality, high order modulation and high bit rate may be used. For example, 64 QAM modulation mode, a large data block size, and a high error correction code (ECC) rate may be used. In scenarios with poor wireless channel quality, a small modulation order and a low bit rate may be used. For example, a QPSK modulation mode, a small data block size, and a low ECC rate may be used.

In a modulation and encoding process of data packets using adaptive modulation and encoding techniques, it is needed to determine a modulation and encoding policy to be used. In some embodiments, a modulation and encoding policy may be characterized by a combination of modulation mode and error correction code rate, which may be specified as shown in Table 1.

TABLE 1

| Modulation Mode | Error Correction Code Rate |
|---|---|
| QPSK | 0.12 |
| QPSK | 0.59 |
| 16QAM | 0.37 |
| 16QAM | 0.6 |
| 64QAM | 0.45 |
| 64QAM | 0.75 |
| 64QAM | 0.93 | where QPSK-0.12 may correspondingly form a modulation and encoding policy, and 64 QAM-0.75 may form another modulation and encoding policy. In one embodiment, a crossed one such as 16 QAM-0.45 may also form a modulation and encoding policy.

In some embodiments, determination of a modulation and encoding policy may include determining a modulation and encoding policy based on results of feedback of cyclic redundancy check (CRC) at the receiving end. The feedback of CRC results may be transmission feedback information. If the feedback is an ACK confirmation message (i.e., a message in the communication field indicating that a packet is correctly received by the receiving end), the sending end (e.g., a device that sends out a message) may switch to select a modulation and encoding policy of higher level. That is, the sending end may select higher modulation mode and error correction code rate, such as adjusting from current QPSK-0.12 to QPSK-0.59. If the feedback is a NACK message (i.e., a message in the communication field indicating that a packet is not correctly received by the receiving end), the sending end may switch to select a modulation and encoding policy of lower level. That is, the sending end may select lower modulation mode and error correction code rate, such as adjusting from current 16 QAM-0.6 to 16 QAM-0.37. In some embodiments, the packet-error-rate level parameter (BLER) of a communication system may be maintained at a stable level by selecting a proper modulation and encoding policy and the retransmission gain may be obtained by retransmitting error frames.

Figure 1:
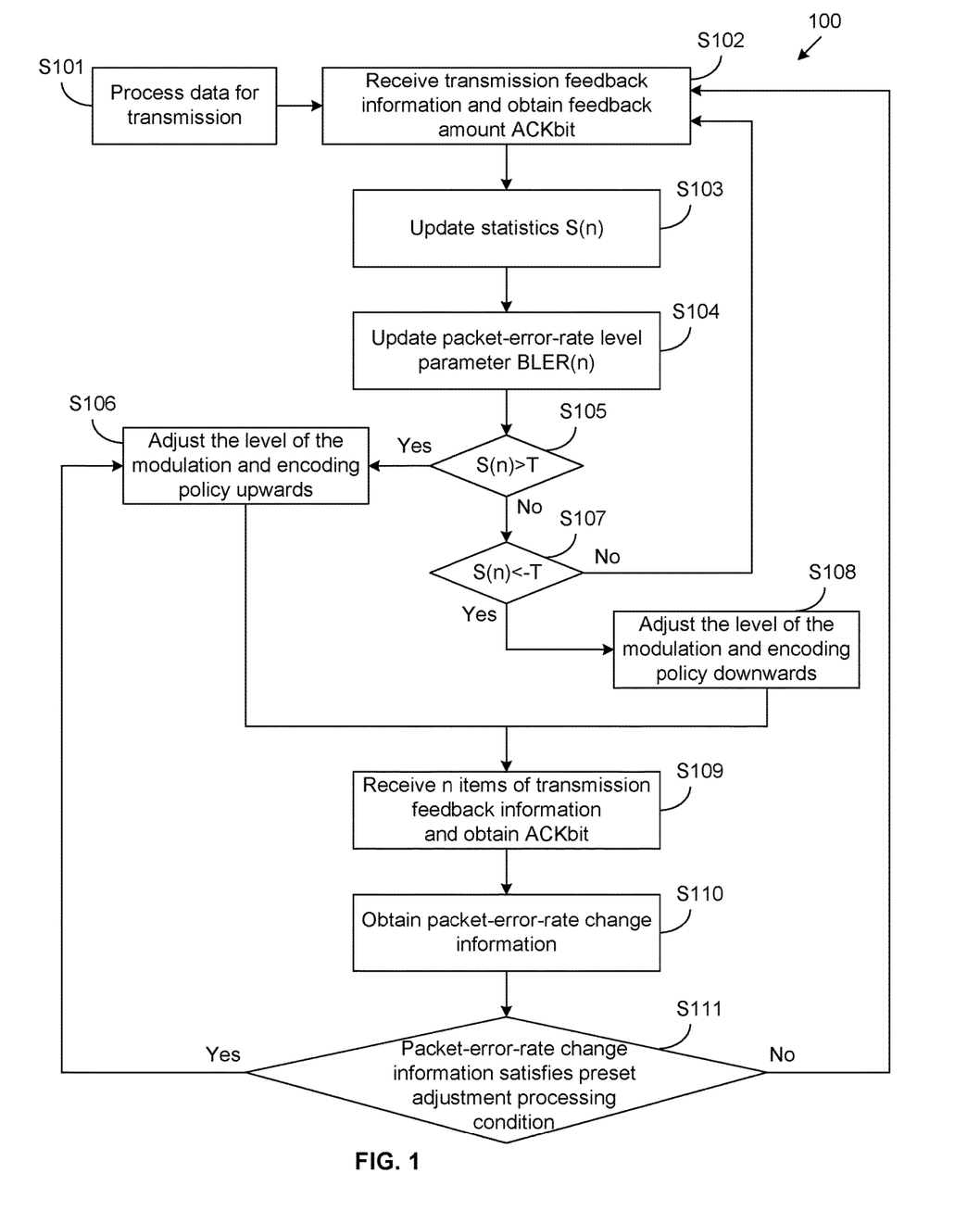
FIG. 1 is a schematic flow chart of a transmission and processing method for data packets according to an exemplary embodiment of the present invention.

FIG. 1 illustrates a schematic flow chart of a transmission and processing method for data packets consistent with the disclosure. The method may be performed by a sending end that needs to transmit data packets, a dedicated communication device, or a communication device mounted on a certain device. For example, the transmission and processing method may be carried out by a communication device mounted on a UAV, when images are transmitted between the UAV and ground user equipment.

At S101, a sending end may process data for transmission based on a modulation and encoding policy of the initial level and send out a data packet. The sending end may set the statistics S(n)=0. In some embodiments, the sending end may need to initialize the level of the modulation and encoding policy before processing the data, and then initialize the preset statistics S(n) and the packet-error-rate level parameter BLER(n).

At S102, the sending end may receive the transmission feedback information and obtain the feedback amount ACKbit. The receiving end may feedback CRC check results through a reverse link. If the receiving end correctly receives a data packet, it may feedback ACK. If the receiving end incorrectly receives a data packet, it may feedback NACK. In such cases, if the CRC of the packet is correct, it may indicate that the packet is correctly received. If the CRC of the packet is incorrect, it may indicate that the packet is not received correctly.

In some embodiments of the disclosure, the feedback amount may be defined by the following.

$$ACKbit(n) = \begin{cases} 0 \\ 1 \end{cases} \quad (1)$$

The feedback amount may be defined such that when the nth packet is received correctly the feedback amount is 0; and when the nth packet is received incorrectly, the feedback amount is 1.

At S103, the sending end may update statistics S(n). Assuming that the target for adjustment of the modulation and encoding policy is to make k=total amount of ACK/total amount of NACK=9. That is, the demand value of packet-error-rate is 10%. When ACKbit (n) is received, the statistics is updated as follows.

$$S(n) = \begin{cases} S(n-1) + 1 \\ S(n-1) - k \end{cases} \quad (2)$$

where the statistics $S(n)=S(n-1)+1$, when an ACK is received and the statistics $S(n)=S(n-1)-k$, when a NACK is received. In a calculation embodiment of the present disclosure regarding statistics, the an adjustment factor is 1 and a second adjustment factor is k.

At S104, the packet-error-rate level parameter BLER (n) is updated. When receiving the ACKbit (n) feedback after sending the nth data packet, the packet-error-rate level parameter is calculated by the following formula.

$$BLER=\alpha*BLER(n-1)+(1-\alpha)*ACKbit(n) \quad (3)$$

where the feedback amount ACKbit (n) is defined by formula (1) and α is a forgetting factor. In one embodiment, the value of α may be 0.98, and the meaning of the value of α is that the weight ratio of a new ACKbit is 1−α.

At S105, whether S(n) is greater than T is determined, where threshold T is set in advance. A basic adjustment process is performed on the modulation and encoding policy of the sending end according to T and S(n). In one embodiment of the present disclosure, the basic adjustment process refers to an adjustment process based on a magnitude relationship between S(n) and a threshold T and a magnitude relationship between S(n) and a threshold −T. When S(n) is greater than T, S106 is executed. When S(n) is less than T, S107 is executed.

At S106, the level of the modulation and encoding policy is adjusted upwards, that is, an upgrade adjustment process is performed.

At S107, whether S(n) is less than −T is determined. When S(n) is less than −T, S108 is executed. When S(n) is not less than −T, S102 is executed to continue the corresponding processing during the data packet sending process.

At S108, the level of the modulation and encoding policy is adjusted downwards, that is, a downgrade adjustment processing is performed. In one embodiment, after level of the modulation and encoding policy is adjusted, the S(n) may be cleared to zero.

Through the adjustment methods described above, the modulation and encoding policy may be adjusted more accurately when there is a sudden interference in the environment, which may better ensure the quality and speed of transmission and improve the transmission efficiency. Further, in one embodiment of the present disclosure, when the communication system is subjected to a constant interference with a fixed duty cycle, more NACKs may be received during the period of the continuous interference. For example, when transmitting images, an aircraft regularly sends signals including the position of the aircraft to a ground terminal, which interferes with transmission of the image data. In this case, when k is constant, S(n) will always decrease. The sending end may need to continuously shift the level of the modulation and encoding policy downwards. However, after the level of the modulation and encoding policy is shifted downwards, some data packets still may not be received correctly based on CRC results at the receiving end, and NACK may still be fed back. Therefore, when it is detected that there is a signal interference that satisfies certain condition, that is, it is detected that there is a constant interference with a fixed duty cycle in a data packet transmission process, the packet-error-rate level parameter at the sending end may be estimated further based on the ACK/NACK signaling, so as to determine whether to perform the position adjustment of the modulation and encoding policy according to the packet-error-rate level parameter.

At S109, n items of transmission feedback information are received and ACKbit may be obtained. Before the position adjustment of the modulation and encoding policy is performed based on the S(n), the estimated packet-error-rate level parameter BLER calculated via formula (3) may be recorded. After the position adjustment of the modulation and encoding policy is performed, when there are M times of ACKbit updates, a new estimated value of the packet-error-rate level parameter may be obtained and denoted as BLER'. M may be equal to $1/(1-\alpha)$, where $\alpha$ is the forgetting factor mentioned above.

At S110, according to the BLER and BLER', packet-error-rate change information ΔBLER may be obtained. In one embodiment, the packet-error-rate change information is the difference between BLER and BLER'.

$$\Delta BLER = BLER' - BLER \quad (4)$$

At S111, whether the packet-error-rate change information satisfies a preset adjustment processing condition is determined. In one embodiment of the present disclosure, a change threshold $B_{th}$ may be set, and a first packet-error-rate threshold $B_l$ and a second packet-error-rate threshold $B_h$ may be set. If $|\Delta BLER| < B_{th}$, and $B_l < BLER' < B_h$, the level of the modulation and encoding policy may be adjusted upwards actively and a new ΔBLER may be recalculated according to the above process, where $B_{th}$ is the threshold for judging the change amount of BLER. In one embodiment, $B_{th}$ may take a value of 0.02, $B_l$ and $B_h$ may be the protection thresholds, respectively. In one embodiment, $B_l$ may take a value of 0.1, and $B_h$ may take a value of 0.65. In some other embodiments, the values of $B_{th}$, $B_l$, and $B_h$ may be set as required. If a user prefers to use a higher-level modulation and encoding policy to transmit data packets, and hopes that the modulation and encoding policy is upgraded more aggressively, $B_{th}$ may be set to a larger value, and the data range between $B_l$ and $B_h$ may be larger, that is, $B_l$ may be set to a smaller value while $B_h$ may be set to a larger value. Conversely, if a user wants to upgrade the modulation and encoding policy more smoothly, $B_{th}$ may be set to a smaller value and the data range between $B_l$ and $B_h$ to be smaller.

If the adjustment processing condition is met, the modulation and encoding policy that is adjusted by the basic adjustment process may be processed by an upgrade adjustment process, that is, the above-mentioned S106 is performed again. If the adjustment processing condition is not met, detection may be triggered to determine whether to perform the basic adjustment process on the modulation and encoding policy, that is, re-execution of S102 may be triggered.

In the above manner, it may be detected whether BLER is affected by a basic adjustment process on the level of the modulation and encoding policy. When the adjustment processing condition is met, it indicates that the upgrade or downgrade of the original modulation and encoding policy does not affect BLER. In order to improve the quality and speed of transmission, the level of the modulation and encoding policy may be adjusted upwards actively until it affects BLER. What contributing to the change of BLER is the data packets that have not been interfered. In this way, the change of BLER may depend on data packets that are not interfered, the influence of the interfered data packets on the adjustment of the modulation and encoding policy may be removed, and the obtained modulation and encoding policy may be more accurate. In addition, a protection range is set, and outside the protection threshold range, the modulation and encoding policy is not adjusted automatically or prompted to be adjusted automatically.

In some embodiments of the present disclosure, a basic adjustment process may be performed on a modulation and encoding policy in a data packet transmission process. After the adjustment process, the adjustment may be further judged based on the packet-error-rate level. The modulation and encoding policy that is adjusted by the basic adjustment process may be adjusted again according to the judgment result, which may satisfy the adjustment needs of the adaptive modulation and encoding policy, improve the quality and speed of data transmission, and improve the throughput when a communication process is affected by interference.

Figure 2:
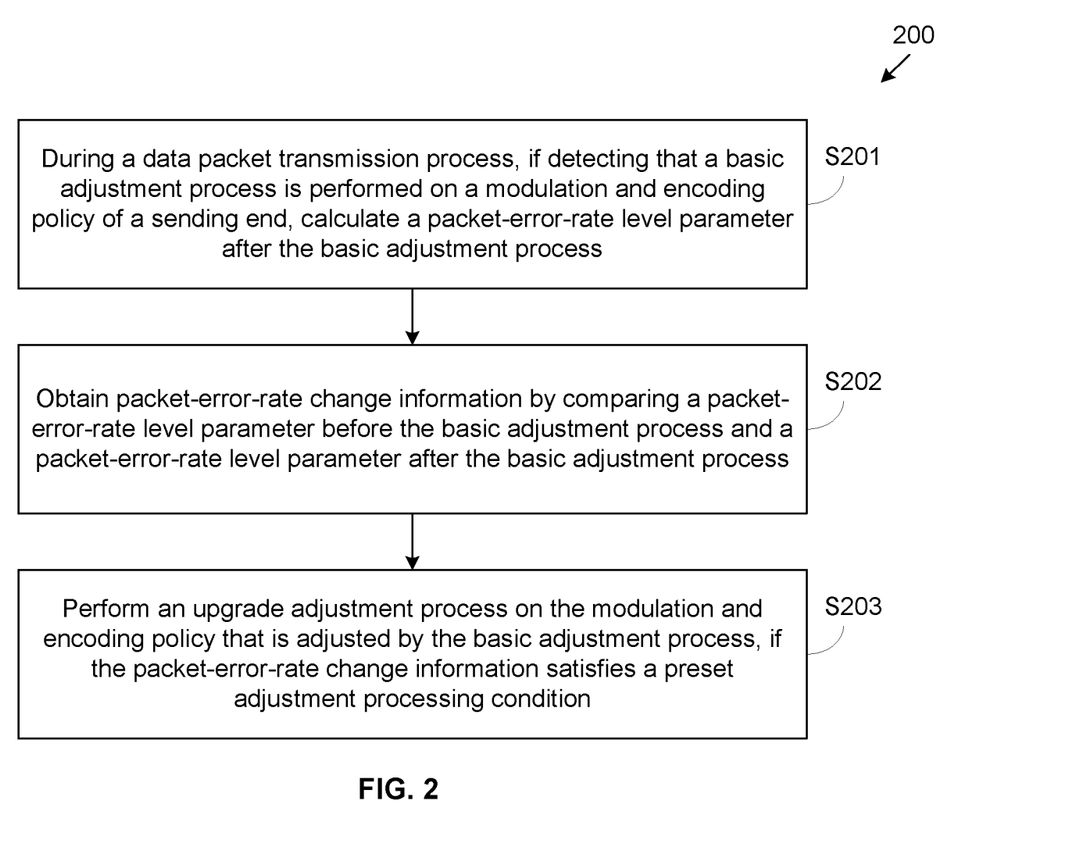
FIG. 2 is a schematic flow chart of a processing method for data packets according to another exemplary embodiment of the present invention.

FIG. 2 illustrates a schematic flow chart 200 of a processing method for data packets consistent with the present disclosure. The method may be executed by various communication devices capable of wireless data transmission, or may be executed by a separate communication device. Specifically, the method may include the following.

At S201, during of a data packet transmission process, if it is detected that the basic adjustment process is performed for the modulation and encoding policy of a sending end, the packet-error-rate level parameter after the basic adjustment process may be calculated. In one embodiment of the present disclosure, the basic adjustment process mainly refers to adjustment on the modulation and encoding policy according to the transmission feedback information of data packets. In another embodiment, a basic adjustment process may include performing an upgrade adjustment or a downgrade adjustment on the modulation and encoding policy based on the value of S(n) (i.e., the value of the statistics) mentioned in the above embodiments, where S(n) is calculated based on the received ACK and NACK. If S(n) is less than −T, a downgrade adjustment process may be performed, and if S(n) is greater than T, an upgrade adjustment process may be performed. The value of S(n) is calculated for each data packet transmitted.

At S202, the packet-error-rate change information may be obtained by comparing a packet-error-rate level parameter before the basic adjustment process and a packet-error-rate level parameter after the basic adjustment process. The packet-error-rate change information may be used to indicate the amount of change of the of packet-error-rate level parameter, and also to indicate whether the adjustment contributes to reducing the packet-error-rate and improving the transmission efficiency after the basic adjustment process is performed. In one embodiment, the packet-error-rate change information may be the difference between a packet-error-rate level parameter before the basic adjustment process and a packet-error-rate level parameter after the basic adjustment process. The packet-error-rate change information may also be other information that may indicate the change of the packet-error-rate level before and after the basic adjustment process.

At S203, if the packet-error-rate change information satisfies a preset adjustment processing condition, an upgrade adjustment process is performed on the modulation and encoding policy after the modulation and encoding policy is adjusted by the basic adjustment process. In one embodiment, when the value corresponding to the packet-error-rate change information is smaller than a preset change threshold, it may be considered that the packet-error-rate change before and after the basic adjustment process is small and meets the adjustment processing condition, and the modulation and encoding policy may be further processed by upgrade adjustment processing. If the value corresponding to the packet-error-rate change information is greater than a preset change threshold, it may be considered that the packet-error-rate change before and after the basic adjustment process is large, and it may be judged whether to perform the basic adjustment process again.

In one embodiment, the packet-error-rate change information meeting a preset adjustment processing condition may also include that the absolute value of the difference is less than a preset change threshold, and the first packet-error-rate level parameter is greater than a preset first packet-error-rate threshold and is smaller than a preset second packet-error-rate threshold. That is, whether the packet-error-rate change information satisfies the condition may be determined by $B_{th}$, $B_1$, and $B_h$ mentioned in the foregoing embodiments. That is, when $|\Delta BLER|<B_{th}$ and $B_1<BLER'<B_h$, it may be determined that the packet-error-rate change information satisfies the preset adjustment processing condition, and upgrade adjustment processing may be performed. Conversely, whether to perform a basic adjustment process may be judged again.

In some embodiments of the present disclosure, a basic adjustment process may be performed on the modulation and encoding policy during a data packet transmission process. After the adjustment process, the adjustment may be further judged based on the packet-error-rate level. The modulation and encoding policy that is adjusted by the basic adjustment process may be adjusted again according to the judgment result, which may satisfy the adjustment needs of the adaptive modulation and encoding policy, improve the quality and rate of data transmission, and improve the throughput when a communication process is affected by interference.

Figure 3:
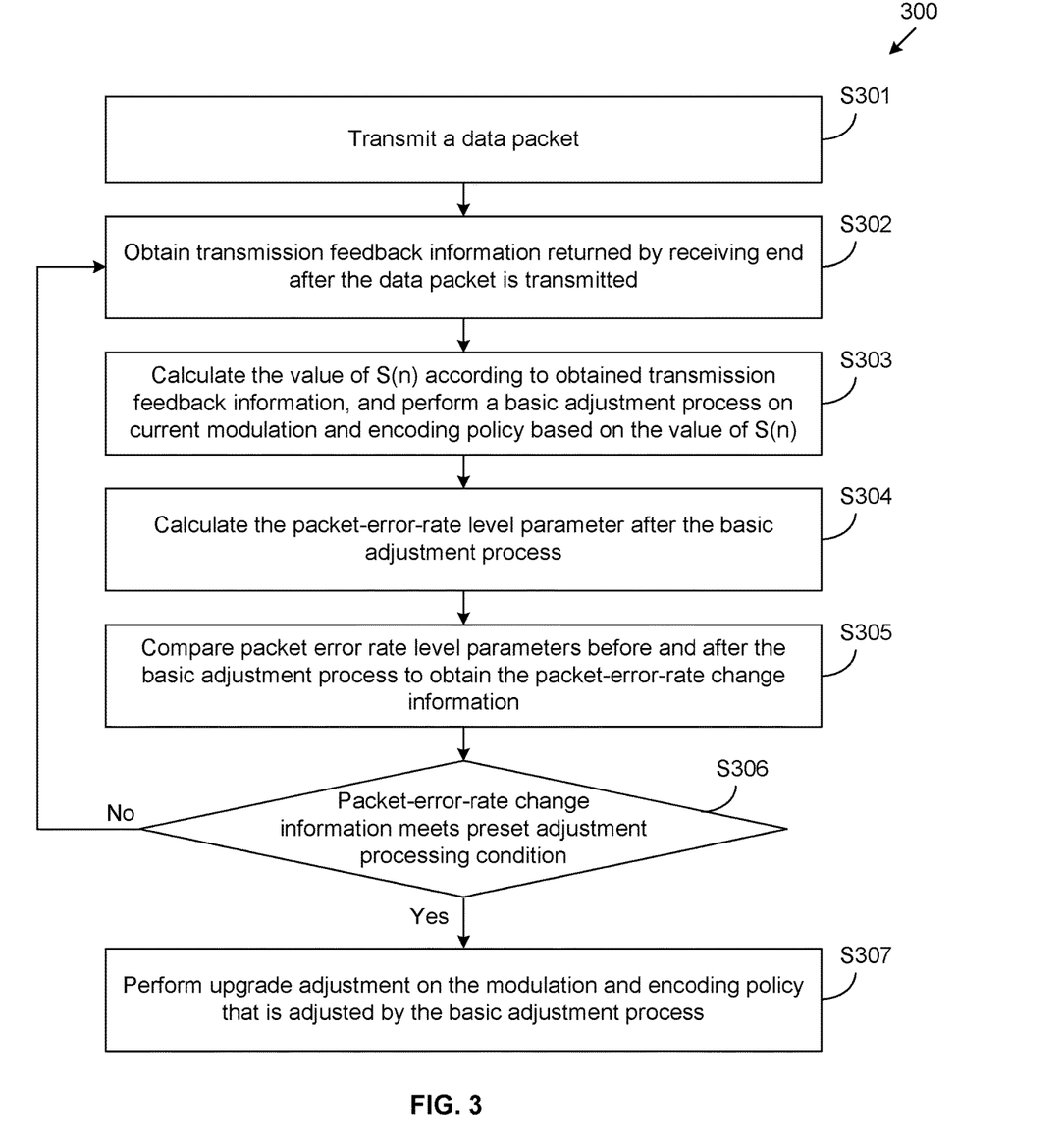
FIG. 3 is a schematic flow chart of a processing method for data packets according to another exemplary embodiment of the present invention.

FIG. 3 illustrates a schematic flow chart 300 of a processing method for data packets consistent with the present disclosure. The method may be executed by various communication devices capable of wireless data transmission, or may be executed by a separate communication device. Specifically, the method may include the following.

At S301, a data packet may be transmitted. The sending end may start to modulate and encode the data based on the modulation and encoding policy of the initial level, and transmit a data packet on a wireless communication channel. The above-mentioned S(n), BLER(n), and other data may be initialized to facilitate subsequent calculations and judgments.

At S302, the transmission feedback information returned by the receiving end may be obtained after the data packet is transmitted. In one embodiment, the transmission feedback information may mainly refer to ACK and NACK messages. After a data packet is sent to the receiving end, the receiving end may proceed based on the CRC check result. If it is determined that the data packet is received correctly based on the check result, an ACK message is returned. If the data packet is not received correctly, a NACK message is returned.

At S303, the value of S(n) may be calculated according to the obtained transmission feedback information, and a basic adjustment process may be performed on the current modulation and encoding policy based on the value of S(n). In one embodiment of the present disclosure, the basic adjustment process may refer to adjustment on the modulation and encoding policy according to transmission feedback information on the data packet.

In one embodiment, if the value of S(n) is less than a first threshold value, a downgrade adjustment process of the basic adjustment process may be performed on the modulation and encoding policy. For example, when S(n) is less than −T, a downgrade adjustment process may be performed, that is, the modulation and encoding strategy may be downshifted by one level. Of course, according to the amount that S(n) is less than −T, for example, when S(n) is far less than −T (the difference between the two is greater than a preset threshold), the modulation and encoding policy may be downgraded by two or more than two levels. In one embodiment, if the value of S(n) is greater than a second threshold, an upgrade adjustment process of the basic adjustment process may be performed on the modulation and encoding policy. For example, if S(n) is greater than T, the upgrade adjustment process may be performed. That is, the position of the modulation and encoding policy may be adjusted upwards by one level. Similarly, if S(n) is much greater than T (the difference between the two is greater than a preset threshold), the position of the modulation and encoding policy may be shifted upwards by two or more than two levels.

After the basic adjustment process is performed on the sending end's modulation and encoding policy, the following may be carried out. In one embodiment, after the basic adjustment process is performed on the modulation and encoding policy of the sending end, it may be first detected whether there is a signal interference that satisfies certain condition during the data packet transmission process. If there is a signal interference that meets the condition, the following S304 may be performed during the data packet transmission process. If there is no signal interference that meets the condition, it is not necessary to perform the following, but may jump directly to S302 to determine whether to perform the basic adjustment process for subsequent data packet transmission. In one embodiment, a signal interference that meets certain condition may refer to a constant interference with a fixed duty cycle during a data packet transmission process.

At S304, the packet-error-rate level parameter after the basic adjustment process may be calculated. In one embodiment, the packet-error-rate level parameter may refer to a parameter obtained by performing packet-error-rate statistics based on received N items of transmission feedback information during a data packet transmission process, where N is a positive integer that is not less than 3. In one embodiment, the packet-error-rate level parameter is always calculated during the entire data packet transmission process, and is calculated once for each transmission feedback message (ACK or NACK) received. In particular, a packet-error-rate level parameter BLER before a basic adjustment process may be recorded, and a packet-error-rate level parameter BLER' may be recorded as well after the basic adjustment process and after sending M data packets or receiving M items of transmission feedback information.

In one embodiment, the packet-error-rate level parameter after a basic adjustment processing may be calculated after the basic adjustment process is performed on the modulation and encoding policy of a sending end, and after the sending end receives M items of transmission feedback information. The value of M is determined according to the forgetting factor. For example, M may be equal to $1/(1-\alpha)$.

In one embodiment, the calculation method of the packet-error-rate level parameter may include determining a feedback amount corresponding to the currently received transmission feedback information; and according to the packet-error-rate level parameter calculated last time, the feedback amount, and a preset forgetting factor, calculating the current packet-error-rate level parameter. For details, it may refer to formula (3). The feedback amount corresponding to the transmission feedback information refers to the feedback amount ACKbit(n) mentioned in the above embodiments, and the value may be 0 or 1. The preset forgetting factor refers to the above mentioned $\alpha$.

At S305, the packet-error-rate level parameter before the basic adjustment process is compared with the packet-error-rate level parameter after the basic adjustment process to obtain the packet-error-rate change information. The packet-error-rate change information is the absolute value of a difference between the packet-error-rate level parameter before the basic adjustment process and the packet-error-rate level parameter after the basic adjustment process. The calculation method of the packet-error-rate change information may be obtained by referring to formula (4) and taking the absolute value.

At S306, whether the packet-error-rate change information meets a preset adjustment processing condition may be determined. If the packet-error-rate change information satisfies the preset adjustment processing condition, the following S307 may be performed. If the packet-error-rate change information does not satisfy the preset adjustment processing condition, S302 may be performed, that is, a detection is triggered to detect whether to perform the basic adjustment process on the modulation and encoding policy again.

At S307, an upgrade adjustment process may be performed on the modulation and encoding policy that is adjusted by the basic adjustment process. The preset adjustment processing condition that the packet-error-rate change information may satisfy includes that an absolute value of the difference is less than a preset change threshold, and the first packet-error-rate level parameter is greater than a preset first packet-error-rate threshold and less than a preset second packet-error-rate threshold.

Figure 4:
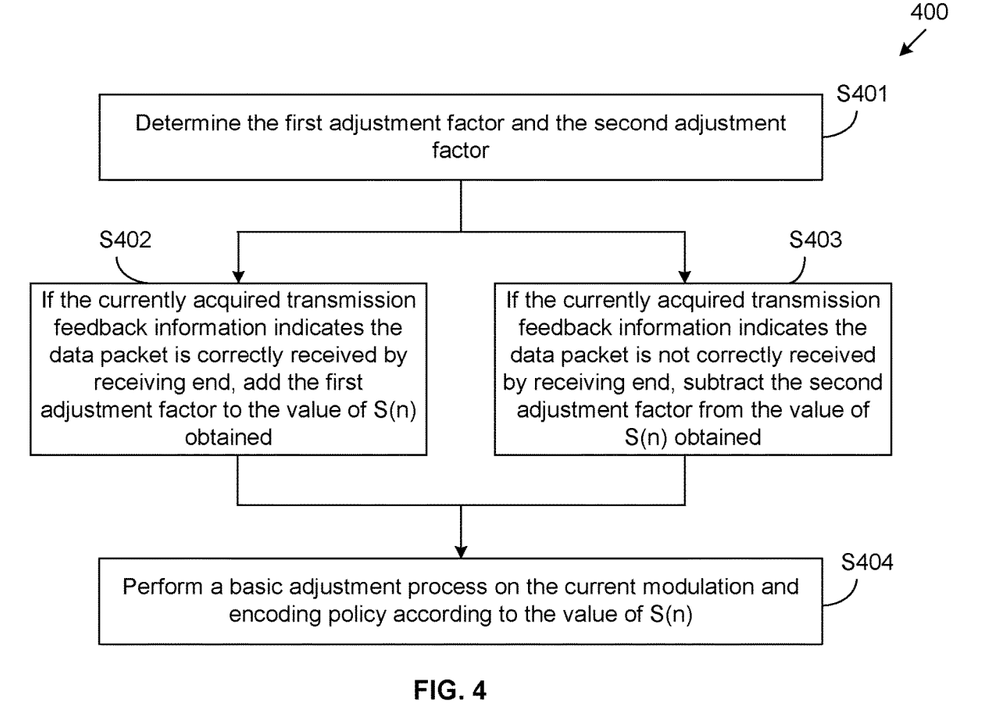
FIG. 4 is a schematic flow chart of a processing method for performing a basic adjustment process according to another exemplary embodiment of the present invention.

FIG. 4 illustrates a schematic flow chart 400 of a method for performing a basic adjustment process consistent with the present disclosure. The method corresponds to S303 in FIG. 3 above. Specifically, the method may include the following.

At S401, a first adjustment factor and a second adjustment factor may be determined. In one embodiment, the second adjustment factor may be determined according to a preset required value of the packet-error-rate at the receiving end. In another embodiment, the first adjustment factor may be directly set to 1, and the second adjustment factor may be a value of k, where k is determined according to a preset required value of the packet-error-rate at the receiving end. For example, when a user wants a packet-error-rate of 10%, it may be set accordingly that k=total number of ACK/total number of NACK=9.

At S402, if the currently received transmission feedback information indicates that the data packet is correctly received by the receiving end, the first adjustment factor may be added to the statistics S(n) obtained.

At S403, if the currently received transmission feedback information indicates that the data packet is not correctly received by the receiving end, the second adjustment factor may be subtracted from the statistics S(n) that has been calculated.

At S404, a basic adjustment process may be performed on the current modulation and encoding policy according to the value of S(n). For the statistics S(n)>T, the level of the modulation and encoding policy may be adjusted upwards, that is, an upgrade adjustment process may be performed. For the statistic S(n)<−T, the level of the modulation and encoding policy may be adjusted downwards, that is, a downgrade adjustment process may be performed. After the level of the modulation and encoding policy is adjusted, the S(n) may be cleared to zero.

In one embodiment of the present disclosure, a basic adjustment process may be performed on the modulation and encoding policy in a data packet transmission process. After the adjustment process, the adjustment may be further judged based on the packet-error-rate level. The modulation and encoding policy that is adjusted by the basic adjustment process may be adjusted again according to the judgment result, which may satisfy the adjustment needs of the adaptive modulation and encoding policy, improve the quality and rate of data transmission, and improve the throughput when a communication process is affected by interference.

The following describes a data packet transmission and processing device and a communication device according to embodiments of the present disclosure.

Figure 5:
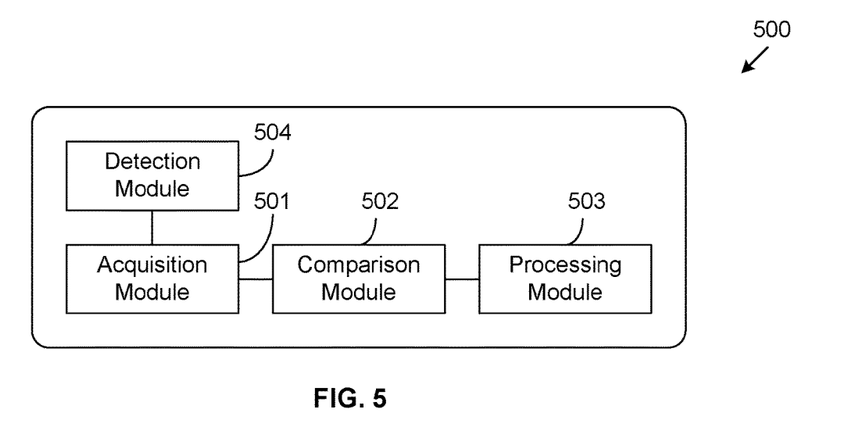
FIG. 5 is a schematic structural diagram of a transmission and processing device for data packets according to another exemplary embodiment of the present invention.

FIG. 5 schematically shows a structural block diagram of a data packet transmission and processing device 500 consistent with the present disclosure. The device 500 may be mounted on certain devices having a wireless communication function. For example, the device 500 may be mounted on a UAV capable of capturing and transmitting images, or may be mounted on a smart terminal such as a smart phone or the like. Specifically, the device 500 may include an acquisition module 501, a comparison module 502, and a processing module 503.

The acquisition module 501 may be used in a data packet transmission process. If it is detected that a basic adjustment process is performed on the modulation and encoding policy of a sending end, the packet-error-rate level parameter after the basic adjustment process may be calculated.

The comparison module 502 may be configured to compare the packet-error-rate level parameters before and after the basic adjustment process and to obtain the packet-error-rate change information.

The processing module 503 may be configured to perform an upgrade adjustment process on the modulation and encoding policy that is adjusted by a basic adjustment process, when the packet-error-rate change information meets a preset adjustment processing condition.

In one embodiment, the basic adjustment process may refer to adjustment on the modulation and encoding policy according to the data packet transmission feedback information.

In one embodiment, the acquisition module 501 may be further configured to obtain the transmission feedback information returned by the receiving end of a data packet after a data packet is transmitted. The processing module 503 may be further configured to calculate the value of $S(n)$ according to the acquired transmission feedback information, and perform the basic adjustment process on the current modulation and encoding policy based on the value of $S(n)$.

In one embodiment, the processing module 503 may be specifically configured to determine a first adjustment factor and a second adjustment factor. If the currently acquired transmission feedback information indicates that the data packet is correctly received by the receiving end, the first adjustment factor may be added to the statistics $S(n)$ obtained. If the currently acquired transmission feedback information indicates that the data packet is not correctly received by the receiving end, the second adjustment factor may be subtracted from the statistics $S(n)$ obtained. The basic adjustment process may be performed on the current modulation and encoding policy according to the value of $S(n)$.

In one embodiment, the second adjustment factor may be determined according to a preset required value of the packet-error-rate at the receiving end.

In one embodiment, the processing module 503 may be specifically configured to perform a downgrade adjustment process on the modulation and encoding policy if the value of $S(n)$ is less than the first threshold. The downgrade adjustment process is in the basic adjustment process.

In one embodiment, the processing module 503 may be specifically configured to perform an upgrade adjustment process on the modulation and encoding policy if the value of $S(n)$ is greater than a second threshold. The upgrade adjustment process is in the basic adjustment process.

In one embodiment, the packet-error-rate level parameter may refer to a parameter obtained by performing packet-error-rate statistics based on received N items of transmission feedback information during a data packet transmission process, where N is a positive integer and not less than 3.

In one embodiment, the calculation method of the packet-error-rate level parameter may include determining a feedback amount corresponding to the currently received transmission feedback information; and according to the packet-error-rate level parameter calculated previously, the feedback amount, and a preset forgetting factor, calculating the current packet-error-rate level parameter.

In one embodiment, the packet-error-rate level parameter after a basic adjustment process may refer to a packet-error-rate level parameter that is calculated after the basic adjustment processing is performed on the modulation and encoding policy of the sending end and after the sending end receives M items of the transmission feedback information. The value of M may be determined according to the forgetting factor.

In one embodiment, the packet-error-rate change information may be an absolute value of a difference between packet-error-rate level parameters before and after a basic adjustment process. Whether the packet-error-rate change information satisfies the preset adjustment processing condition may be determined. The preset adjustment processing condition may include that an absolute value of the difference is less than a preset change threshold, and that a first packet-error-rate level parameter is greater than a preset first packet-error-rate threshold and less than a preset second packet-error-rate threshold.

In one embodiment, the processing module 503 may be further configured to trigger a detection to detect whether to perform a basic adjustment process on the modulation and encoding policy if the packet-error-rate change information does not meet the preset adjustment processing condition.

In one embodiment, the device 500 may further include a detection module 504, which may be configured to detect whether there is a signal interference that satisfies certain condition during a data packet transmission process. If a signal interference satisfying the condition is detected, the acquisition module 501 may be notified to calculate the packet error level parameter after the basic adjustment process.

In one embodiment, a signal interference that satisfies the condition may refer to a constant interference with a fixed duty cycle during a data packet transmission process.

In one embodiment of the present disclosure, a basic adjustment process may be performed on the modulation and encoding policy in a data packet transmission process. After the adjustment process, the adjustment may be further judged based on the packet-error-rate level. The modulation and encoding policy that is adjusted by the basic adjustment process may be adjusted again according to the judgment result, which may satisfy the adjustment needs of the adaptive modulation and encoding policy, improve the quality and rate of data transmission, and improve the throughput when a communication process is affected by interference.

Figure 6:
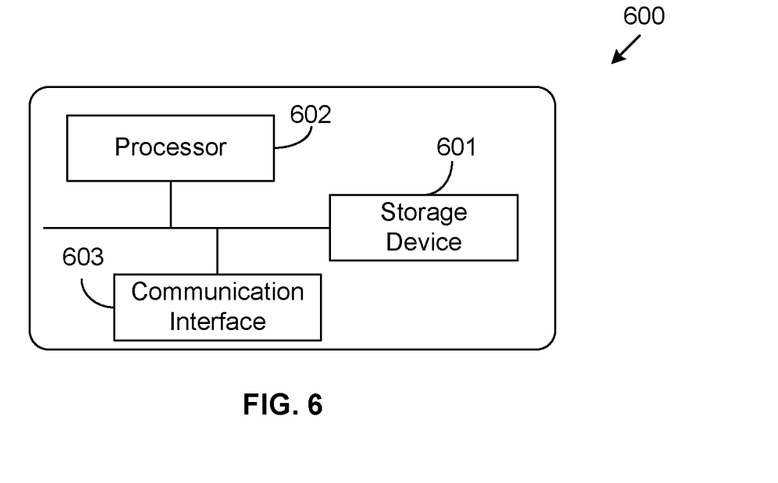
FIG. 6 is a schematic structural diagram of a communication device according to another exemplary embodiment of the present invention.

FIG. 6 schematically shows a structural block diagram of a communication device 600 consistent with the present disclosure. The communication device 600 may include a power supply module (not shown), a housing (not shown), and other components (not shown), and may further include a storage device 601 and a processor 602. In one embodiment, the communication device 600 may be a dedicated device for performing communication processing. The communication device 600 may further include a communication interface 603. From other devices, the communication interface 603 may receive data to be transmitted, and after corresponding processing is performed by the processor 602, the communication interface 603 may send a corresponding data packet to a receiving end. In one embodiment, the communication device 600 may be a multi-functional device that may have its own data to be transmitted. For example, the communication device 600 may be a device such as a smart phone, a device such as an aircraft that needs to transmit images, and so on.

The storage device 601 may include a volatile memory, such as random-access memory (RAM). The storage device 601 may also include a non-volatile memory, such as a flash memory, a hard disk drive (HDD), or a solid-state drive (SSD). The storage device 601 may also include a combination of the above types of memory. Further, the storage device 601 may include computer storage medium that may include one or more of the above types of memory.

The processor 602 may be a central processing unit (CPU). The processor 602 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a general array logic (GAL), or any combination thereof.

In some embodiments, the storage device 601 may be configured to store executable program instructions in the computer storage medium. The processor 602 may execute the program instructions to implement corresponding methods in embodiments shown in FIGS. 1, 2, 3, and 4 of the present disclosure.

Specifically, the processor 602 may be configured to execute the program instructions stored at the storage device 601 and carry out the following. During a data packet transmission process, if it is detected that a basic adjustment process is performed on the modulation and encoding policy of a sending end, the processor may calculate the packet-error-rate level parameter after the basic adjustment process, and compare the packet-error-rate level parameters before and after the basic adjustment process to obtain the packet-error-rate change information. If the packet-error-rate change information meets the preset adjustment processing condition, the processor 602 may perform an upgrade adjustment process on the modulation and encoding policy that is adjusted by the basic adjustment process.

In one embodiment, the basic adjustment process may refer to adjustment on the modulation and encoding policy based on the data packet transmission feedback information.

In one embodiment, the processor 602 may be further configured to obtain the transmission feedback information returned by a receiving end of a data packet after the data packet is transmitted, calculate the value of $S(n)$ according to the acquired transmission feedback information, and perform a basic adjustment process on the current modulation and encoding policy based on the value of $S(n)$.

In one embodiment, the processor 602 may be configured to determine a first adjustment factor and a second adjustment factor. If the currently acquired transmission feedback information indicates that a data packet is correctly received by the receiving end, the first adjustment factor may be added to the value of $S(n)$ obtained. If the currently acquired transmission feedback information indicates that the data packet is not correctly received by the receiving end, the second adjustment factor may be subtracted from the value of $S(n)$. A basic adjustment process may be performed on the current modulation and encoding policy according to the value of $S(n)$.

In one embodiment, the second adjustment factor may be determined according to a preset packet-error-rate required value at a receiving end.

In one embodiment, the processor 602 may be configured to perform a downgrade adjustment process on the modulation and encoding policy if the value of $S(n)$ is less than the first threshold. The downgrade adjustment process is in the basic adjustment process.

In one embodiment, the processor 602 may be configured to perform an upgrade adjustment process on the modulation and encoding policy if the value of $S(n)$ is greater than the second threshold. The upgrade adjustment process is in the basic adjustment process.

In one embodiment, the packet-error-rate level parameter may refer to a parameter obtained by performing packet-error-rate statistics based on received N items of the transmission feedback information during a data packet transmission process, where N is a positive integer and not less than 3.

In one embodiment, the processor 602 may be configured to determine a feedback amount corresponding to the currently received transmission feedback information, and according to the packet-error-rate level parameter calculated last time, the feedback amount, and a preset forgetting factor, calculate the current packet-error-rate level parameter.

In an embodiment, the packet-error-rate level parameter after the basic adjustment process may refer to a parameter that is calculated after a basic adjustment process is performed on the modulation and encoding policy of a sending end, and after the sending end receives M items of the transmission feedback information. The value of M is determined according to the forgetting factor.

In one embodiment, the packet-error-rate change information may be an absolute value of a difference between the packet-error-rate level parameters before and after the basic adjustment process. It may be determined whether the packet-error-rate change information satisfies the preset adjustment processing condition. The preset adjustment processing condition may include that an absolute value of the difference is less than a preset change threshold, and the first packet-error-rate level parameter is greater than a preset first packet-error-rate threshold and is less than a preset second packet-error-rate threshold.

In one embodiment, the processor 602 may be further configured to trigger a detection to detect whether to perform a basic adjustment process on the modulation and encoding policy if the packet-error-rate change information does not satisfy the preset adjustment processing condition.

In one embodiment, the processor 602 may be further configured to detect whether there is a signal interference satisfying certain condition during a data packet transmission process. If a signal interference satisfying the condition is detected, the calculation of the packet-error-rate level parameter after a basic adjustment process may be triggered.

In one embodiment, a signal interference that meets certain condition may refer to a constant interference with a fixed duty cycle during a data packet transmission process.

In some embodiments of the present disclosure, a basic adjustment process may be performed on the modulation and encoding policy in a data packet transmission process. After the adjustment process, the adjustment may be further judged based on the packet-error-rate level. The modulation and encoding policy that is adjusted by the basic adjustment process may be adjusted again according to the judgment result, which may satisfy the adjustment needs of the adaptive modulation and encoding policy, improve the quality and rate of data transmission, and improve the throughput when a communication process is affected by interference.

Further, it should be noted that the above embodiments are used only to illustrate the technical solutions of the present disclosure and not to limit it to the present disclosure. Although the present disclosure is described in detail in the light of the foregoing embodiments, those of ordinary skill in the art should understand that they can still modify the technical solutions recorded in the preceding embodiments, or they can perform equivalent replacements for some or all of the technical features. The modifications or substitutions, however, do not make the nature of the corresponding technical solutions out of the scope of the technical solutions of each embodiment of the present disclosure.

What is claimed is:

1. A data transmission and processing method for a communication device, comprising:
   during a data packet transmission process, calculating a packet-error-rate level parameter after a basic adjustment process, if it is detected that the basic adjustment process is performed on a modulation and encoding policy of a sending end;
   obtaining packet-error-rate change information by comparing a packet-error-rate level parameter before the basic adjustment process with a packet-error-rate level parameter after the basic adjustment process; and
   performing an upgrade adjustment process on the modulation and encoding policy that is adjusted by the basic adjustment process, if the packet-error-rate change information satisfies a preset adjustment processing condition.

2. The method according to claim 1, wherein the basic adjustment process includes:
   adjustment on the modulation and encoding policy based on transmission feedback information of a data packet.

3. The method according to claim 1, further comprising:
   obtaining transmission feedback information returned by a receiving end of a data packet after the data packet is transmitted; and
   calculating a value of statistics according to the obtained transmission feedback information and performing the basic adjustment process on the current modulation and encoding policy based on the value of the statistics.

4. The method according to claim 3, wherein calculating the value of the statistics according to the obtained transmission feedback information and performing the basic adjustment process on the current modulation and encoding policy based on the value of the statistics includes:
   determining a first adjustment factor and a second adjustment factor;
   adding the first adjustment factor to the value of the statistics obtained if currently acquired transmission feedback information indicates that a data packet is correctly received at the receiving end;
   subtracting the second adjustment factor from the value of the statistics obtained if the currently acquired transmission feedback information indicates that a data packet is not correctly received at the receiving end; and
   performing the basic adjustment process on the current modulation and encoding policy according to a value of the statistics.

5. The method according to claim 4, wherein the second adjustment factor is determined according to a preset required value of a packet-error-rate at the receiving end.

6. The method according to claim 4, wherein performing the basic adjustment process on the current modulation and encoding policy according to the value of the statistics includes:
   performing a downgrade adjustment process on the modulation and encoding policy if the value of the statistics is less than a first threshold, the downgrade adjustment process being in the basic adjustment process; and
   performing an upgrade adjustment process on the modulation and encoding policy if the value of the statistics is greater than a second threshold, the upgrade adjustment process being in the basic adjustment process.

7. The method according to claim 1, wherein:
   the packet-error-rate level parameter refers to a parameter obtained by performing packet-error-rate statistics based on received N items of transmission feedback information during the data packet transmission process, N being a positive integer that is not less than 3; and
   a calculation method of the packet-error-rate level parameter includes:
   determining a feedback amount corresponding to currently received transmission feedback information; and
   according to a packet-error-rate level parameter calculated last time, the feedback amount, and a preset forgetting factor, calculating current packet-error-rate level parameter.

8. The method according to claim 7, wherein the packet-error-rate level parameter after the basic adjustment process refers to a packet-error-rate level parameter that is calculated after the basic adjustment processing is performed on the modulation and encoding policy of the sending end and after the sending end receives M items of the transmission feedback information, the value of M being determined according to the forgetting factor.

9. The method according to claim 1, wherein the packet-error-rate change information is an absolute value of a difference between the packet-error-rate level parameter before the basic adjustment process and the packet-error-rate level parameter after the basic adjustment process, the preset adjustment processing condition that the packet-error-rate change information satisfies include that an absolute value of the difference is less than a preset change threshold, and that a first packet-error-rate level parameter is greater than a preset first packet-error-rate threshold and less than a preset second packet-error-rate threshold.

10. The method according to claim 1, further comprising:
    triggering a detection to detect whether to perform the basic adjustment process on the modulation and encoding policy if the preset adjustment processing condition is not met.

11. The method according to claim 1, further comprising:
    detecting whether there is a signal interference that satisfies certain condition during the data packet transmission process;
    calculating the packet-error-rate level parameter after the basic adjustment process when there is a signal interference that satisfies the certain condition; and
    wherein the signal interference that satisfies the certain condition refers to a constant interference with a fixed duty cycle during the data packet transmission process.

12. A communication device comprising:
    a processor; and
    a storage device;
    wherein the processor is configured to execute program instructions stored at the storage device for performing:
    calculating a packet-error-rate level parameter after a basic adjustment process, if it is detected that the basic adjustment process is performed on a modulation and encoding policy of a sending end during a data packet transmission process;
    obtaining packet-error-rate change information by comparing a packet-error-rate level parameter before the basic adjustment process and a packet-error-rate level parameter after the basic adjustment process; and performing an upgrade adjustment process on the modulation and encoding policy that is adjusted by the basic adjustment process, if the packet-error-rate change information meets a preset adjustment processing condition.

13. The device according to claim 12, wherein the basic adjustment process refers to adjustment on the modulation and encoding policy based on transmission feedback information of a data packet.

14. The device according to claim 12, wherein the processor is further configured to perform:

obtaining transmission feedback information returned by a receiving end of a data packet after the data packet is transmitted; and calculating a value of statistics according to the obtained transmission feedback information and performing the basic adjustment process on the current modulation and encoding policy based on the value of the statistics.

15. The device according to claim 14, wherein the processor is further configured to perform:

determining a first adjustment factor and a second adjustment factor;

adding the first adjustment factor to the value of the statistics obtained if currently acquired transmission feedback information indicates that a data packet is correctly received at the receiving end;

subtracting the second adjustment factor from the value of the statistics obtained if the currently acquired transmission feedback information indicates that a data packet is not correctly received at the receiving end; and performing the basic adjustment process on the current modulation and encoding policy according to a value of the statistics.

16. The device according to claim 15, wherein the second adjustment factor is determined according to a preset required value of a packet-error-rate at the receiving end.

17. The device according to claim 15, wherein the processor is further configured to perform:

performing a downgrade adjustment process on the modulation and encoding policy if the value of the statistics is less than a first threshold, the downgrade adjustment process being in the basic adjustment process; and performing an upgrade adjustment process on the modulation and encoding policy if the value of the statistics is greater than a second threshold, the upgrade adjustment process being in the basic adjustment process.

18. The device according to claim 12, wherein:

the packet-error-rate level parameter refers to a parameter obtained by performing packet-error-rate statistics based on received N items of transmission feedback information during the data packet transmission process, N being a positive integer that is not less than 3; and the processor is further configured to perform:

determining a feedback amount corresponding to currently received transmission feedback information; and according to a packet-error-rate level parameter calculated last time, the feedback amount, and a preset forgetting factor, calculating current packet-error-rate level parameter.

19. The device according to claim 18, wherein the packet-error-rate level parameter after the basic adjustment process refers to a packet-error-rate level parameter that is calculated after the basic adjustment processing is performed on the modulation and encoding policy of the sending end and after the sending end receives M items of the transmission feedback information, the value of M being determined according to the forgetting factor.

20. The device according to claim 12, wherein the packet-error-rate change information is an absolute value of a difference between the packet-error-rate level parameter before the basic adjustment process and the packet-error-rate level parameter after the basic adjustment process, the preset adjustment processing condition that the packet-error-rate change information satisfies include that an absolute value of the difference is less than a preset change threshold, and that a first packet-error-rate level parameter is greater than a preset first packet-error-rate threshold and is less than a preset second packet-error-rate threshold.

21. The device according to claim 12, wherein the processor is further configured to perform:

triggering a detection to detect whether to perform the basic adjustment process on the modulation and encoding policy if the preset adjustment processing condition is not met.

22. The device according to claim 12, wherein the processor is further configured to perform:

detecting whether there is a signal interference that satisfies certain condition during the data packet transmission process;

calculating the packet-error-rate level parameter after the basic adjustment process when there is a signal interference that satisfies the certain condition; and wherein the signal interference that satisfies the certain condition refers to a constant interference with a fixed duty cycle during the data packet transmission process.

* * * * *